(12) United States Patent
Obi

(10) Patent No.: US 9,043,132 B2
(45) Date of Patent: May 26, 2015

(54) APPARATUS FOR ESTIMATING TRAVEL PATH OF A VEHICLE

(75) Inventor: Masakazu Obi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 13/806,897

(22) PCT Filed: Jun. 15, 2011

(86) PCT No.: PCT/JP2011/003416
§ 371 (c)(1),
(2), (4) Date: Dec. 26, 2012

(87) PCT Pub. No.: WO2012/001896
PCT Pub. Date: May 1, 2012

(65) Prior Publication Data
US 2013/0110391 A1    May 2, 2013

(30) Foreign Application Priority Data
Jun. 29, 2010  (JP) .................................. 2010-148345

(51) Int. Cl.
*G08G 1/16*  (2006.01)
*G01C 21/00*  (2006.01)
*G01S 13/93*  (2006.01)

(52) U.S. Cl.
CPC ............... *G01C 21/00* (2013.01); *G01S 13/931* (2013.01); *G08G 1/165* (2013.01);
(Continued)

(58) Field of Classification Search
CPC ........ G01S 13/931; G08G 1/165; G08G 1/16; G01C 21/00; G05D 1/021–1/0257; B60Q 5/005

USPC .................................................. 701/400, 301
See application file for complete search history.

(56) References Cited

U.S. PATENT DOCUMENTS 5,274,576 A * 12/1993 Williams .............................. 1/1
5,657,225 A *  8/1997 Bauer ............................. 701/23
(Continued)

FOREIGN PATENT DOCUMENTS

EP   1 843 173 A1   10/2007
EP   1 843 174 A2   10/2007
(Continued)

OTHER PUBLICATIONS

European Search Report dated Apr. 14, 2014 issued over the corresponding EP Patent Application 11800371.4.

*Primary Examiner* — Helal A Algahaim
*Assistant Examiner* — Genna Mott
(74) *Attorney, Agent, or Firm* — Carrier Blackman & Associates, P.C.; Joseph P. Carrier; Jeffrey T. Gedeon

(57) ABSTRACT

An apparatus for estimating a travel path of a vehicle is mounted on the vehicle; and includes: an object detection device that detects an object lying ahead of the vehicle; a stationary object detection device that determines whether a detected object is a stationary object; a device that calculates an approximate straight line indicating a path of the stationary object from the temporal positional data for the stationary object projected on two-dimensional coordinates using a vehicle position as a starting point; a device that calculates a orthogonal line which passes through a midpoint in the temporal positional data for the stationary object and goes straight with respect to the approximate straight line on the two-dimensional coordinates; and a device that calculates a vehicle turning radius from an intersection point where the orthogonal line intersects with a x axis.

9 Claims, 4 Drawing Sheets

(52) U.S. Cl.
CPC  *G01S 2013/9375* (2013.01); *G01S 2013/9346* (2013.01); *G01S 2013/9353* (2013.01); *G01S 2013/9389* (2013.01)

(56) References Cited

U.S. PATENT DOCUMENTS

| | | | |
|---|---|---|---|
| 5,745,870 A * | 4/1998 | Yamamoto et al. | 701/301 |
| 5,754,099 A * | 5/1998 | Nishimura et al. | 340/435 |
| 5,955,967 A * | 9/1999 | Yamada | 340/904 |
| 6,591,192 B2 * | 7/2003 | Okamura et al. | 701/301 |
| 7,684,945 B2 * | 3/2010 | Walter et al. | 702/96 |
| 8,195,363 B2 * | 6/2012 | Isaji et al. | 701/41 |
| 2001/0025211 A1 | 9/2001 | Shirai et al. | |
| 2001/0053955 A1 | 12/2001 | Shirai et al. | |
| 2005/0228580 A1 | 10/2005 | Winner et al. | |
| 2007/0239358 A1 | 10/2007 | Okazaki et al. | |
| 2007/0241870 A1 | 10/2007 | Ohmura et al. | |
| 2011/0307175 A1 * | 12/2011 | Gandhi et al. | 701/301 |

FOREIGN PATENT DOCUMENTS

| | | |
|---|---|---|
| JP | 08-132997 A | 5/1996 |
| JP | 2005-332192 A | 12/2005 |
| JP | 2007-004711 A | 1/2007 |
| JP | 2007-278892 A | 10/2007 |
| JP | 2007-280144 A | 10/2007 |
| JP | 2008-027309 A | 2/2008 |
| JP | 2010-093610 A | 4/2010 |
| JP | 2012-066777 A | 4/2012 |

* cited by examiner

APPARATUS FOR ESTIMATING TRAVEL PATH OF A VEHICLE

FIELD OF THE INVENTION

The present invention relates to an apparatus for estimating a travel path of a vehicle, in particular to detection of a stationary object lying ahead of the vehicle, and to estimation of a vehicle travel path from the detected positional information.

BACKGROUND ART

Patent document 1 discloses a vehicle traveling path estimating device. The device estimates a travel path of a user's vehicle from data indicating a traveling state of the user's vehicle relative to detected obstacles without using a yaw rate sensor.

PRIOR ART DOCUMENT

Patent Document 1: JP 8-132997 A

SUMMARY OF THE INVENTION

Problems to be Solved

The vehicle traveling path estimating device disclosed in Patent Document 1, needs to utilize output values from various sensors, such as a rudder angle sensor, in place of the yaw rate sensor, to acquire data indicating a travel state of the user's vehicle in relation to a detected obstacle. Accuracy of the estimation of the travel path of the user's vehicle may be lowered due to accumulation of errors in the output values from the sensors.

It is an objective of the present invention to alleviate or reduce the problem imminent in the prior art, i.e., to improve the accuracy of estimation of a travel path of the user's vehicle without the use of the yaw rate sensor and with the use of an object detection device that detects one or more objects lying ahead of the vehicle.

Solution to the Problem

The present invention provides an apparatus for estimating a travel path of the vehicle. The apparatus comprises an object detection device that detects an object lying ahead of the vehicle, a stationary object determination device that determines whether the detected object is a stationary object, and a device that calculates an approximate straight line indicating a path of the stationary object from temporal positional data of the stationary object projected on two-dimensional (X, Y) coordinates, with a vehicle position as the origin. The apparatus further includes a device that calculates an orthogonal line that passes through a midpoint M ($X_M$, $Y_M$) of the temporal positional data of the stationary object and is orthogonal to the approximate line on the two-dimensional coordinates, and a device that calculates a turning radius (R) of the vehicle from an intersection point $X_r$ (R, O) where the orthogonal line intersects with the X axis.

According to the present invention, accurate estimation of a travel path of the vehicle may be achieved using the detection device only regardless of road surface conditions and other conditions are as long as the vehicle is in environment where multiple stationary objects exist, because the invention focuses on temporal positional data of one stationary object.

According to one embodiment of the present invention, the invention further comprises a device that calculates a yaw rate of the vehicle from the turning radius obtained for each stationary object when multiple stationary objects exist, and estimates a travel path of the vehicle from an average value of the calculated yaw rate.

According to the present invention, the invention enables averaging the calculated yaw rate (the turning radius) when multiple stationary objects may be detected, thus smoothing abnormal values to reduce an influence induced in the event that abnormal values are detected.

DESCRIPTION OF EMBODIMENTS

Figure 1:
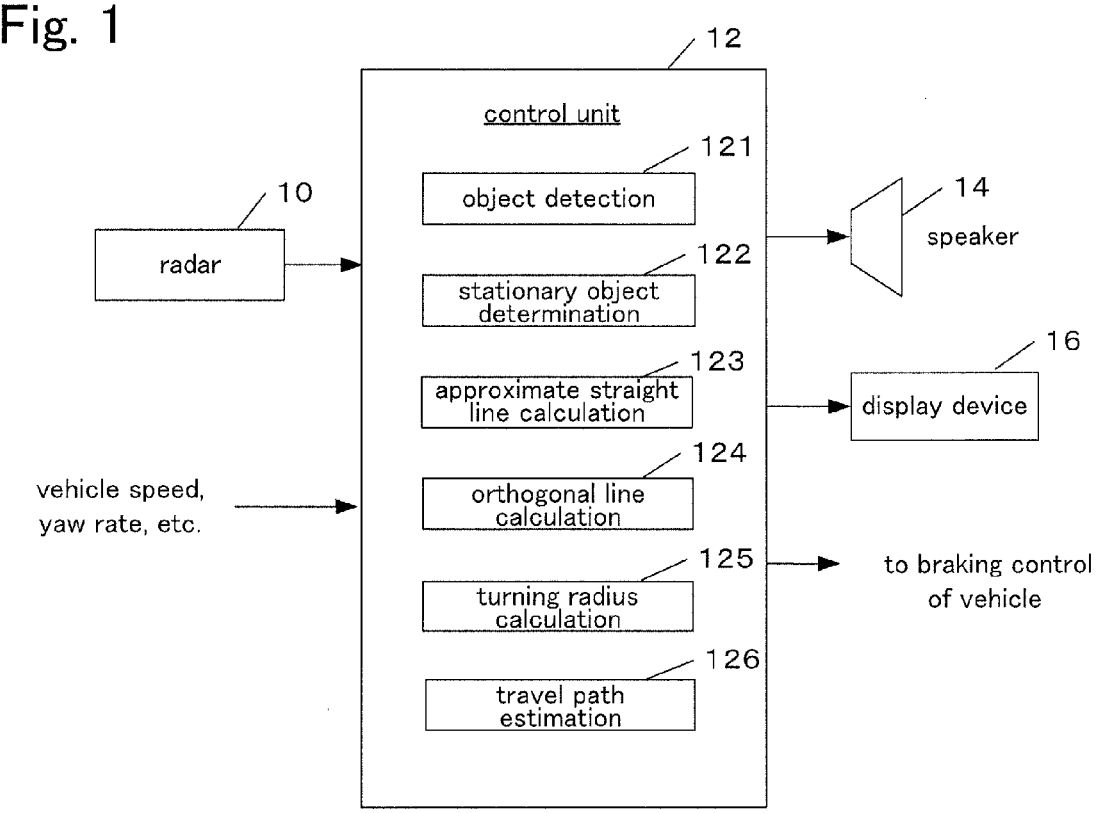
FIG. 1 is a block diagram showing a configuration of a travel path estimating device according to one embodiment of the present invention.

Hereinafter, a description will be made with reference to the accompanying drawings. FIG. 1 is a block diagram illustrating a configuration of an apparatus for estimating a travel path of a vehicle according to one embodiment of the present invention. The apparatus includes a radar 10, a control unit 12 for estimating a travel path of a vehicle based on object information (position, distance, etc.) acquired by the radar 10, and a speaker 14 for issuing a warning by sound or by voice based on a control signal provided by the control unit 12. The apparatus also includes a display device 16 that provides a display screen to make the driver aware of the presence of one or more objects around the vehicle based on the object information acquired by the radar 10.

The radar 10 is, for example, a scanning laser radar which receives laser beam reflected from objects, the laser beam scanning different directions, and detects as detection points positions (regions) of objects (candidates) in each direction and distances to the objects. Alternatively, the radar 10 may be other types of radar (for example, a millimeter wave radar and others). Instead of radar 10, cameras such as an infrared camera may be used. Further, in a vehicle equipped with a navigation system, corresponding functions that the navigation system has may also be used for the speaker 14 and the display device 16.

The control unit 12 illustrated in FIG. 1 has functions indicated by blocks 121 through 126. More specifically, the control unit 12 serves as an object detection device 121 that receives detection signals from the radar 10 and detects one or more objects lying ahead of the vehicle. Control unit 12 serves as a stationary object determination device 122 that determines whether the detected object is a stationary object. Control unit 12 also serves as a device 123 that calculates an approximate curve indicating a path (locus) of the stationary object based on temporal positional data of the stationary object projected on XY coordinates whose origin is the position of the vehicle. Control unit 12 further serves as a device 124 for calculating an orthogonal line that passes the midpoint $(X_M, Y_M)$ in the temporal positional data of the stationary object and is orthogonal to the approximate line. Control unit 12 also serves as a device 125 that calculates a turning radius R of the vehicle from the intersection point Xr (R,O) where the above mentioned orthogonal line interests the X axis.

The control unit 12 also serves as a device 126 that calculates a yaw rate of the vehicle from the turning radius obtained for each stationary object when multiple stationary objects exist, and estimates a travel path of the vehicle from an average value of the calculated yaw rate.

The control unit 12 further has a function of executing necessary processes upon reception of a detection signal from a speed sensor for detecting the speed of the user's vehicle, a brake sensor, a yaw rate sensor for detecting a yaw rate (a change rate of a rotation angle in a turning direction), and other sensors. The processes involve generating control signals for executing braking control of the vehicle based on the estimated result of the travel path of the vehicle and various values detected by the sensors.

The function of each block is implemented by a computer (CPU) included in the control unit 12. The control unit 12 may of course be built in a navigation system.

The control unit 12 includes as a hardware configuration an A/D conversion circuit for converting input analog signals into digital signals, an image memory for storing a digitized image signals, a central processing unit (CPU) for executing various arithmetic processes, a RAM for temporarily storing data when the CPU executes arithmetic processes, and a ROM for storing programs to be executed by the CPU and data (including a table and a map, etc.) that is used by the programs. The control unit 12 may further include an output circuit for providing drive signals to the speaker 14 and display signals to the display device 16, and other control signals.

Figure 2:
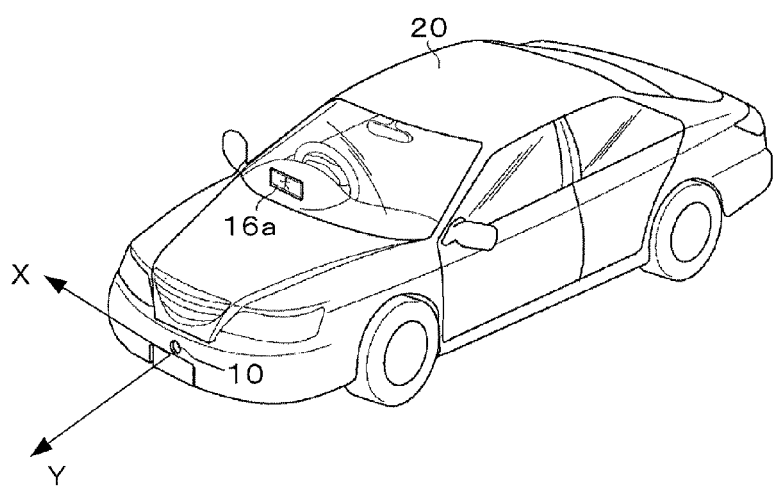
FIG. 2 is a view illustrating a mounting position of an object detection device and other devices according to one embodiment of the present invention.

FIG. 2 is a view illustrating mounting positions of the radar 10 and other devices shown in FIG. 1 according to one embodiment of the present invention. As shown in FIG. 2, the radar 10 is placed at the center in the width direction of a front bumper of the vehicle 20. A reference numeral 16a in FIG. 2A denotes an exemplary case where a head up display (hereinafter referred to as a "HUD") is used as the display device 16. The HUD 16a is provided to present a display screen at a position that does not obstruct a driver's front field of view through a front window shield.

Figure 3:
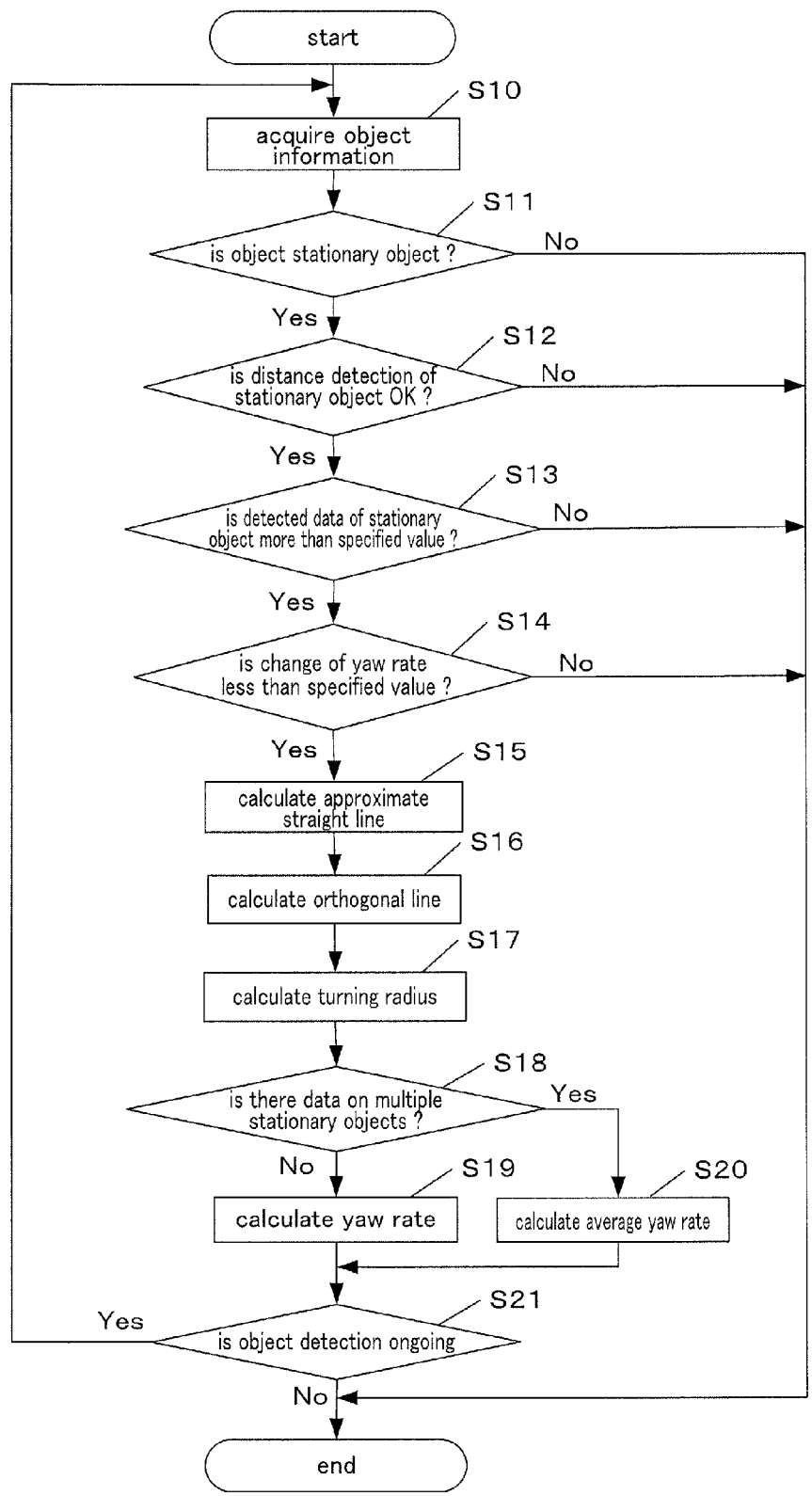
FIG. 3 is a flow chart of the process executed in a control unit according to one embodiment of the present invention.

FIG. 3 is a process flow executed by the control unit 12 according to one embodiment of the present invention. This process flow is executed by the CPU of the control unit 12 at specified time intervals by invoking processing programs stored in the memory.

In step S10, a position of the object lying ahead of the vehicle is determined responsive to signals from the radar 10. The position may be determined with the use of various methods including a method described below.

A scanning laser radar is used as the radar 10, and the position of an object, for example, an obstacle candidate is determined from the width of the detection-point group. Specifically, the scanning laser radar receives reflection of the beams that scan in different directions, the reflection being made by the object and measures as detection-points the distance to the object in each direction. A set of detection points is obtained by plotting a position of the detection points on a two-dimensional coordinates system (see FIG. 2) in which a forward direction of the radar is the y axis and a transverse direction is the X axis, with the position of the laser radar assuming the origin. From the set of the detection points, those whose interval to each other is less than a specified value are grouped into a detection group, and out of the grouped detection-points, those whose spreading width is less than a specified value are regarded as object candidates (for example, obstacle candidates) and their positions are identified. Positional information of the detected objects is sequentially stored in the memory as temporal information.

Figure 4:
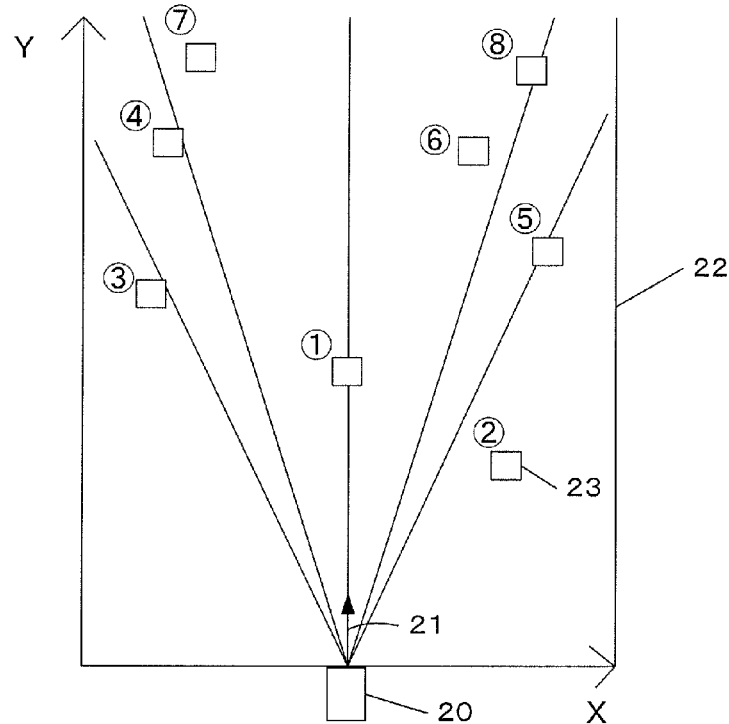
FIG. 4 is a conceptual diagram of positional information of detected object candidates according to one embodiment of the present invention.

FIG. 4 is a conceptual diagram of the positional information of the detected object candidates. In FIG. 4, eight objects 23 numbered from one to eight are detected in a detection region of the laser radar in a traveling direction 21 of the vehicle 20, the positions being shown in the XY coordinates. The eight objects may contain both stationary objects and the other objects.

In step S11, whether the detected object is a stationary object or not is determined. The determination is made based on a relative speed between the vehicle and the detected object, that is, the difference between the speed of the vehicle and the amount of movement per unit time of the detected object. If the relative speed is less than a specified value, the detected object is determined to be stationary. As an alternative, a moving vector of the detected object may be used to determine whether the magnitude of the moving vector is less than a specified value. If the result of the determination is positive, then the process proceeds to next step S12, and if negative, the process may be terminated.

Figure 5:
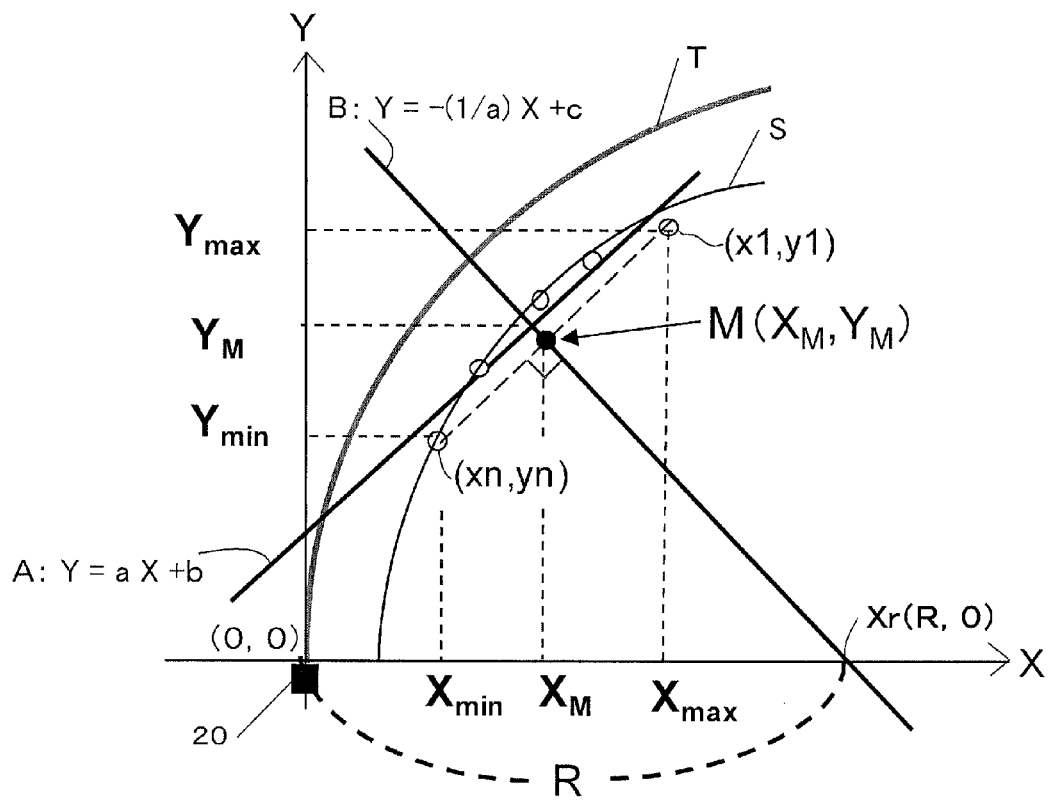
FIG. 5 is a chart illustrating a history (change of position) of a detected stationary object according to one embodiment of the present invention.

In step S12, determination is made whether a distance (a position) of the stationary object is properly obtained as temporal data. FIG. 5 illustrates a history (of change of positions) of the detected stationary object. In FIG. 5, n positional data (x1, y1) to (xn, yn) are shown as history of the stationary object along an arc S on the XY coordinates.

The details of FIG. 5 will be described later. The determination shown in step S12 is carried out by determining whether the relation of the following formula (1) exists for Y coordinate values of the positional data. The determination of the formula (1) detects whether the position (a distance) of the stationary object becomes close to (becomes short) the vehicle as the vehicle travels.

$$y1 > y2 > y3 > \ldots > yn \qquad (1)$$

If a result of the determination is Yes, then the processing proceeds to step S13, else if No, the processing will be terminated thereat.

In step S13, determination is made whether the temporal positional data of the detected stationary object is greater than a specified number. The specified number is determined beforehand by test runs of the vehicle based on accuracy of the radar 10 to be used and based on a targeted yaw rate error. The specified value is, for example, 30. If the result of the determination is Yes, then the process proceeds to step S14, or if No, the process returns back to step S10 and repeats data acquisition.

In step S14, determination is made whether a change rate (deg/s) of the yaw rate detected by the yaw rate sensor is within the specified value. This determination is executed for the purpose of stopping estimation process under the conditions that the vehicle travels a curve or a winding road resulting in a unstable path of the vehicle and a high change rate of the yaw rate. If the result of the determination is Yes, then the process proceeds to step S15, or if No, the process will be terminated.

In step S15, an approximate straight line is calculated from the history (temporal positional data) on the two-dimensional (XY) coordinates. With reference to FIG. 5, a linear function represented by the following equation (2) for a straight approximate line A is calculated such that the difference of the approximate line from X coordinate values of the n positional data (x1, y1) to (xn, yn) is minimized, the n positional data forming a history of the stationary object and is on the arc S on the XY coordinates.

$$Y=aX+b \qquad \text{equation (2)}$$

Incidentally, the least squares method or other method may be used to determine the approximate function for calculation of the approximate straight line A.

In step S16, an orthogonal line crossing the approximate line A is calculated. First, a midpoint of the positional data (x1, y1) through (xn, yn) is determined. Specifically, in FIG. 5, the farthest coordinate (x1, y1) and the nearest coordinate (xn, yn) of the positional data are connected by a straight line and a coordinate M $(X_M, Y_M)$ of the midpoint of the straight line is determined. Then, an orthogonal line B that passes through the coordinate M $(X_M, Y_M)$, the midpoint, and is orthogonal to the straight line A is calculated. In FIG. 5, the orthogonal line B may be expressed as a liner function of the following equation (3).

$$Y=-(1/a)X+c \qquad \text{equation (3)}$$

In step S17, a turning radius R of the vehicle is calculated. Specifically, an intersection point Xr (R,0) where the orthogonal line B obtained in step S16 intersects with a X axis. A X coordinate value R of the intersection point Xr is the turning radius R, that is, a curvature radius R of the travel path as the position of the vehicle 20 is the origin (0,0). When X=R is entered to the equation (3) and the former coordinate M $(X_M, Y_M)$ of the midpoint is used, the turning radius R can be represented by the following equation (4). A travel path T of the vehicle can be estimated from the turning radius R.

$$R = a \cdot c \qquad \text{equation (4)}$$
$$= XM + aY_M$$

When multiple stationary objects are detected, corresponding turning radius R is calculated from a path of each stationary object. In this ways, according to one embodiment of the present invention, the invention allows estimating (calculating) the turning radius R and the travel path T basically based only on the detected information.

In step S18, determination is made whether data on the detected multiple stationary objects, that is, the turning radii R are obtained concurrently. If the result of the determination is No, then the process proceeds to next step S19, and if Yes, the process proceeds to step S20.

In step S19, the obtained turning radius R is converted into a yaw rate. Specifically, a yaw rate γ is calculated using the following equation (5), where V is a vehicle speed.

$$γ=V/R \qquad \text{equation (5)}$$

In this connection, the dimension of γ is (rad/s) for R (m) and V (m/s). γ (rad/s) obtained from equation (5) may be converted to γ (deg/s) by multiplying it by 180/π.

Figure 6:
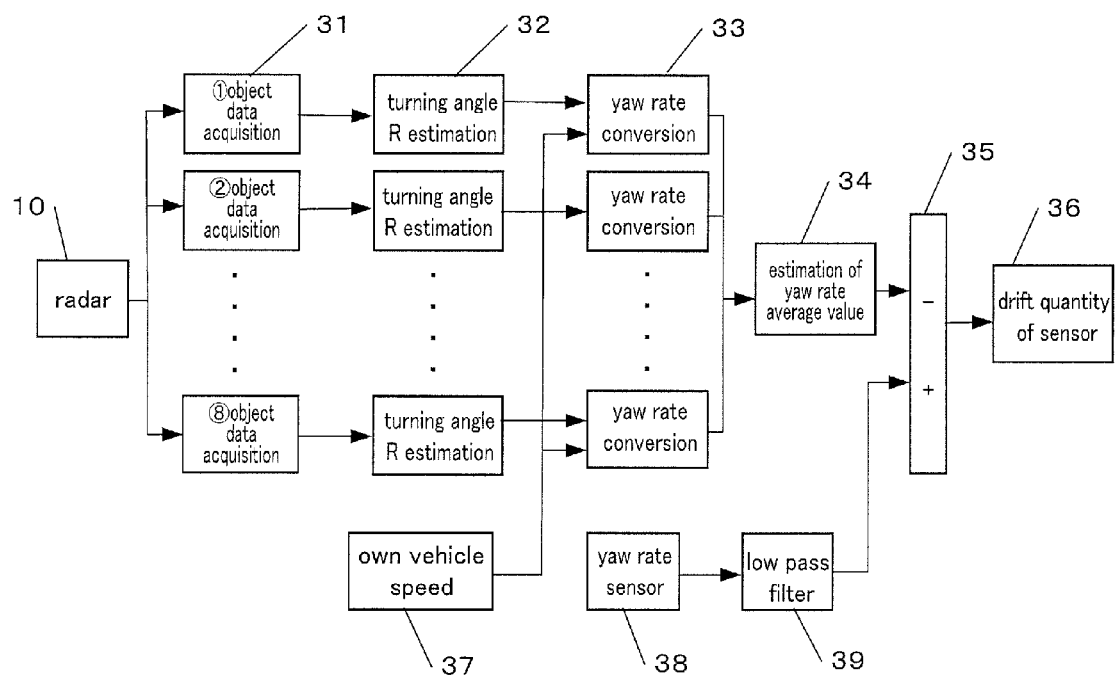
FIG. 6 is a block diagram illustrating a flow for averaging a yaw rate.

In step S20, an average value of the yaw rate is calculated. FIG. 6 is a view showing a flow of averaging of the yaw rate by blocks. FIG. 6 relates to an example where eight objects 23 shown in FIG. 4 are detected. Data (positional information) of the eight objects 23 are acquired upon reception of signals from the radar 10 (block 31). The turning radii R corresponding to the objects that are determined to be stationary objects are calculated (block 32). Each turning radius R is converted into yaw rate γ (block 33) using the vehicle speed V (block 37). The details of the above mentioned process to be executed have been described with reference to steps S10 through S18.

In block 34, an average value of the obtained yaw rate γ is calculated. In this manner, according to one embodiment of the present invention, when multiple stationary objects are detected, averaging of the calculated yaw rate (the turning radius) is performed which achieves smoothing of abnormal values when abnormal values are detected, thus influence of the abnormal values is reduced.

Further, when a yaw rate value detected by the yaw rate sensor is available, such detected value is acquired (block 38). The detected yaw rate value is passed through a low pass filter (block 39) and the difference between the filtered yaw rate value and the average value of the yaw rate is calculated (block 35). A drift amount of the yaw rate sensor may be derived from the difference value (block 36). The drift amount may be used to correct output values from the yaw rate sensor. Thus, According to one embodiment of the present invention, estimation of the turning radius R and the yaw rate γ is achieved, and at the same time the values detected from the yaw rate sensor are corrected using the estimated value.

Now back to FIG. 3, determination is made whether or not object detection is continued by radar 10 in step S21. If the determination is positive, the process goes back to step S10 to repeat a sequence of process with a specified time intervals. And, if the determination is negative, the process terminates.

While the description is made to embodiments of the present invention, the invention is not limited to the embodiments. The invention may be used with modification within the scope of the present invention. For example, whereas in the embodiments, the radar 10 is placed on the front bumper of the vehicle, it may be placed inside the front grill, and the range of radar radiation may be covered by a radar transparent film.

REFERENCE SIGNS LIST

10: radar
12: control unit
14: speaker
16: display device
16a: HUD
20: vehicle
22: radar detection area
23: detected object (stationary object)

The invention claimed is:

1. An apparatus for estimating a travel path of a vehicle comprising:
    means for detecting an object lying ahead of the vehicle;
    means for determining whether the detected object is a stationary object;
    means for calculating an approximate straight line indicating a path of the stationary object based on temporal positional data of the stationary object projected on two-dimensional coordinates, the origin of the coordinates being the position of the vehicle;
    means for calculating a straight line that passes through a midpoint of the temporal positions of the stationary object and is orthogonal to the approximate line on the two-dimensional coordinates;
    means for calculating a turning radius of the vehicle from an intersection point where the orthogonal line intersects the X axis, with the X axis extending laterally with respect to the vehicle and a heading of the vehicle;

means for calculating a calculated yaw rate of the vehicle from the turning radius obtained for each stationary object when multiple stationary objects exist; and means for estimating the travel path of the vehicle from an average value of the calculated yaw rate.

2. The apparatus according to claim 1, wherein the means for calculating the calculated yaw rate of the vehicle from the turning radius obtained for each stationary object when multiple stationary objects exist further includes:

means for calculating a yaw rate of the vehicle per each stationary object from the turning radius obtained for each stationary object and a vehicle speed; and means for calculating an average value of the yaw rate per each obtained stationary object when multiple stationary objects exist.

3. The apparatus according to claim 2, further comprising:

means for calculating a difference between a detected yaw rate value detected by a yaw rate sensor arranged in the vehicle and the average value of the calculated yaw rate, wherein the calculated yaw rate is used for correction of the detected yaw rate.

4. An apparatus for calculating a travel path of a vehicle, comprising:

a radar device mounted on the vehicle; and a control unit mounted on the vehicle including a processor and a non-transitory computer readable medium containing instructions for controlling the processor to:

detect an object lying ahead of the vehicle using the radar device;

determine whether the detected object is stationary;

calculate an approximate straight line indicating a path of the stationary object based on temporal positional data of the stationary object projected on two-dimensional coordinates, the origin of the coordinates being the position of the vehicle;

calculate a straight line that passes through a midpoint of the temporal positions of the stationary object and is orthogonal to the approximate line;

calculate a turning radius of the vehicle from the point on the X axis at which the orthogonal line intersects the X axis, a curve drawn with the turning radius forming a part of the estimated path of the vehicle, with the X axis extending laterally with respect to the vehicle and a heading of the vehicle;

calculate a calculated yaw rate of the vehicle from the turning radius obtained for each stationary object when multiple stationary objects exist; and estimate the travel path of the vehicle from an average value of the calculated yaw rate.

5. The apparatus according to claim 4, wherein when calculating the calculated yaw rate of the vehicle from the turning radius obtained for each stationary object when multiple stationary objects exist said control unit is further configured to:

calculate a yaw rate of the vehicle per each stationary object from the turning radius obtained for each stationary object and a vehicle speed; and calculate an average value of the yaw rate per each obtained stationary object when multiple stationary objects exist.

6. The apparatus according to claim 5, said control unit further configured to:

calculate a difference between detected a yaw rate value detected by a yaw rate sensor arranged in the vehicle and the average value of the calculated yaw rate, wherein the calculated yaw rate is used for correction of the detected yaw rate.

7. A method for calculating a travel path of a vehicle, comprising:

detecting an object lying ahead of the vehicle using a radar device mounted on the vehicle;

determining, by a control unit, whether the detected object is stationary;

calculating, by the control unit, an approximate straight line indicating a path of the stationary object based on temporal positional data of the stationary object projected on two-dimensional coordinates, the origin of the coordinates being the position of the vehicle;

calculating, by the control unit, a straight line that passes through a midpoint of the temporal positions of the stationary object and is orthogonal to the approximate line;

calculating, by the control unit, a turning radius of the vehicle from the point on the X axis at which the orthogonal line intersects the X axis, a curve drawn with the turning radius forming a part of the estimated path of the vehicle, with the X axis extending laterally with respect to the vehicle and a heading of the vehicle;

calculating, by the control unit, a calculated yaw rate of the vehicle from the turning radius obtained for each stationary object when multiple stationary objects exist; and estimating, by the control unit, the travel path of the vehicle from an average value of the calculated yaw rate.

8. The method according to claim 7, wherein the calculation of the calculated yaw rate of the vehicle from the turning radius obtained for each stationary object when multiple stationary objects exist further includes:

calculating a yaw rate of the vehicle per each stationary object from the turning radius obtained for each stationary object and a vehicle speed; and calculating an average value of the yaw rate per each obtained stationary object when multiple stationary objects exist.

9. The method according to claim 8, further comprising:

calculating a difference between a detected yaw rate value detected by a yaw rate sensor arranged in the vehicle and the average value of the calculated yaw rate, wherein the calculated yaw rate is used for correction of the detected yaw rate.

* * * * *